C. H. KELLEY.

GREASE CUP.

APPLICATION FILED FEB. 16, 1920.

Reissued Mar. 7, 1922.

15,300.

Inventor

Charles H. Kelley

By his Attorney

J. Rowe Millward.

UNITED STATES PATENT OFFICE.

CHARLES H. KELLEY, OF PITTSBURGH, PENNSYLVANIA.

GREASE CUP.

15,300. Specification of Reissued Letters Patent. Reissued Mar. 7, 1922.

Original No. 1,274,558, dated August 6, 1918, Serial No. 232,812, filed May 6, 1918. Application for reissue filed February 16, 1920. Serial No. 358,889.

*To all whom it may concern:*

Be it known that I, CHARLES H. KELLEY, a citizen of the United States, residing at Pittsburgh, N. S., in the county of Allegheny and State of Pennsylvania, have invented a new and useful Improvement in Grease Cups, of which improvement the following is a specification.

My invention relates to improvements in grease cups as employed on moving parts of machinery such as the connecting rods of locomotives.

Considerable expense and inconvenience attends the use of the class of grease cups wherein a screw plug stopper is employed for initially compressing the moderately hard grease and effecting a closure of the cups, owing to the plugs working loose and becoming detached as a result of constant movement when in service. This form of grease cup is largely employed on connecting rods of locomotives, and the loss of stopper plugs along the road and necessarily replacing thereof entails considerable financial loss annually.

The object of my invention is to provide a grease cup or receptacle having a non-detachable slidingly-adjustable cover with suitable means for locking the cover in its normal or closed position.

With the above object in view, the invention consists in certain features of construction, parts and combination of parts, as will be hereinafter described and particularly pointed out in the appended claims.

The embodiments shown in the accompanying drawings fully exemplify the invention but is not to be considered as a limitation. In said drawings:—

Figure 1:
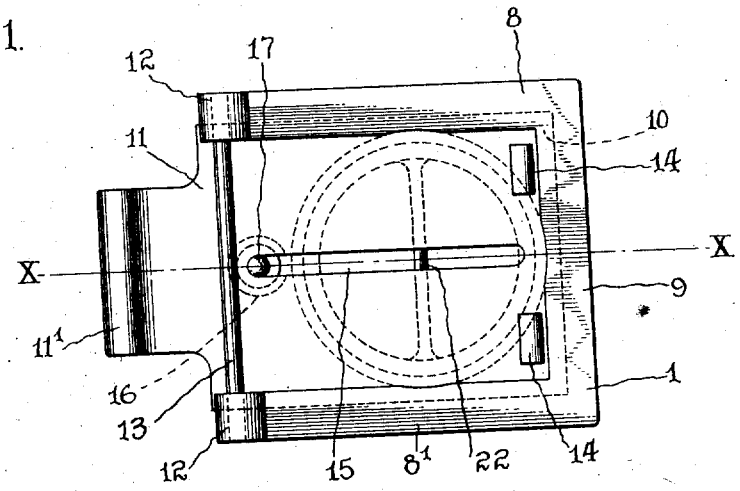
Figure 1 is a plan of said embodiment.
Figure 2:
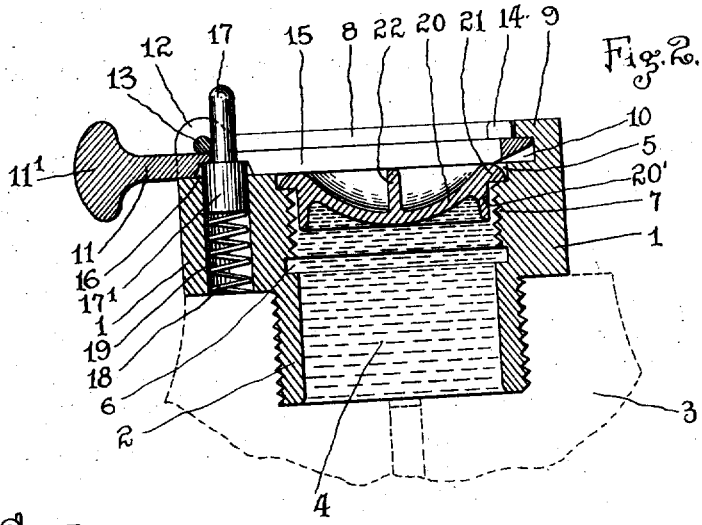
Fig. 2 is a side elevation of the same, on the line $x$—$x$ of Fig. 1.

Referring to Figs. 1 and 2, the grease cup or receptacle comprises a rectangular body 1 provided with a dependent externally threaded annular portion 2 adapted to connect the same to any suitable bearing, as 3. This body is provided with an annular opening or well for the reception and confinement of the grease 4, the upper portion of said well from the annular grooves 5 to 6, is threaded at 7, the purpose of which will be hereinafter set forth. The upper portion of the body is provided with side flanges 8 and 8′ which are integral with a rear flange 9, there being a groove 10 extending about said flanges for the reception and operation of the slidable cover 11, said side flanges having secured to the lugs 12 thereof the transverse rod 13 which extends over the cover. This cover has an enlarged head 11′ at its forward end, by which it is driven in place, and a pair of projecting stops 14 on its rear portion to engage the rod 13 when in open position to prevent becoming detached when inserting grease. The cover is tapered on the under rear extremity and is provided longitudinally with an elongated slot 15, the forward end of said slot terminating in the annular recess 16 formed at the underside of the slide. This slot has extending therethrough the small end 17 of the locking pin 17′, said locking pin engaging normally in the recess 16 of the slide and retained in this locking position by engagement therewith of a spiral spring 18 disposed within the opening 19 of the cup body wherein said pin is loosely fitted. Loosely arranged, within the cup body, directly below the slide, is the annular cap 20, for compressing the grease, which is in this instance, of concavo-convex form in cross-section with a downwardly dependent flange 20′, and the horizontally disposed flange portion 21 by which it is supported on the shouldered portion of the groove 5. This flanged portion 21 is rounded off on its upper side, the body of the cup having a bridge or web 22 extending thereacross and adapted for removal of the cap when necessary in renewing the grease.

In practice, the locking pin is depressed sufficient to release the slide, which is then drawn out as far as it will go, or until the stops 14 engage the rod 13, after which the cap 20 is removed. The grease is then inserted, filling the well almost to the groove 5, the cap then inserted on top of the grease and compressed into the grease as far as possible, after which the slide is driven into closed position. In driving the slide inward the tapered end thereof engages the tapered edge of the flanged portion of the cup and, as the slide advances, it compresses the cup until seated. This compression forces the grease to the bearing as is the case where a screw cap is employed.

In case it is necessary to fill the cup with a grease compression force pump, the slide is opened, the compression cap removed and the threaded connection of the force pump screwed into the threaded portion 7.

Figure 3:
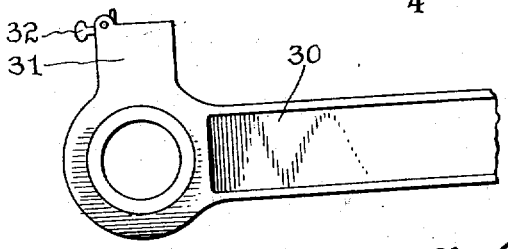
Fig. 3 is a side elevation of a portion of a connecting rod having the grease cup integral therewith.

Referring to Fig. 3, the rod 30 has the grease cup portion 31 with slide 32 of similar construction to that of Figs. 1 and 2, formed integral with said rod, which will be found preferable in some instances.

As heretofore stated, I do not confine myself to the particular embodiment shown and described, but reserve the right to such structural changes or modifications as will be within the scope of the following claims.

What I claim is:—

1. In a grease cup, a grease receptacle, a slidably attached cover therefor, means to lock said cover in normally closed position on said receptacle, and a grease compression cap disposed therein beneath and compressible into its normal position by said cover.

2. In a grease cup, a grease receptacle, a slidable but permanently attached cover therefor, means to lock said cover in normally closed position on said receptacle, and a grease compression cap disposed within said receptacle beneath and compressible into its normal position by said cover, said receptacle having a shouldered recess upon which said cap normally engages.

3. The combination with a bearing having a grease receptacle, of a slidable but fixedly attached cover for said receptacle, means to automatically lock said cover in its normal closed position on said receptacle, and a grease compression cap disposed within said receptacle beneath and operatively seated in its normal position by the closure of said cover.

4. In a grease cup, a grease receptacle, a slidably attached cover therefor, means to lock said cover in normally closed position on said receptacle and a grease compression cap disposed therein beneath said cover, substantially as described.

5. A grease cup comprising a body formed with a grease receptacle therein having an unobstructed open bottom, means for closing the top of said receptacle comprising a cover slidably supported for rectilinear movement only and in a single plane, means for limiting the outward movement of the cover, and resilient means for locking the same in normally closed position.

6. A grease cup comprising a body formed with a grease receptacle, a movable cover therefor, and a grease compression cap cooperating with the cover and disposed beneath the same within the said receptacle.

7. A grease cup comprising a body formed with a grease receptacle, a movable cover therefor, locking means for said cover and a grease compression cap cooperating with the cover and disposed beneath the same within said receptacle.

8. A grease cup comprising a hollow body provided with a bore extending therethrough, a slidable cover for one end thereof, and a compression cap within the bore adapted to be held therein by the said cover when in closed position.

9. A grease cup comprising a hollow body provided with a bore extending therethrough, a slidable cover for one end thereof, a compression cap within the bore adapted to be held therein by said cover, means for limiting the outward movement of the cover, and means for locking the same in closed position.

10. A grease cup comprising a body formed with a grease receptacle, a movable cover therefor having an inclined inner edge, a grease compression cap disposed within the receptacle and provided with an oppositely inclined peripheral edge the said inclined edges cooperating to force the cap into operative position.

In testimony whereof, I have signed my name to this specification, in the presence of two subscribing witnesses.

CHARLES H. KELLEY.

Witnesses:
WALTER T. COBB,
A. K. STEELE.